United States Patent [19]

Royster

[11] Patent Number: 4,543,744
[45] Date of Patent: Oct. 1, 1985

[54] PLANT GROWING CHAMBER

[76] Inventor: John L. Royster, 60 O St., Salt Lake City, Utah 84103

[21] Appl. No.: 583,821

[22] Filed: Feb. 27, 1984

[51] Int. Cl.⁴ .............................................. A016 9/00
[52] U.S. Cl. ........................................... 47/17; 47/60
[58] Field of Search ................... 47/17, 18, 60, 62, 65

[56] References Cited

U.S. PATENT DOCUMENTS

| | | | |
|---|---|---|---|
| 3,348,922 | 10/1967 | Bose et al. | 47/17 |
| 3,943,658 | 3/1976 | Hai | 47/60 |
| 4,091,566 | 5/1978 | Horváth et al. | 47/DIG. 6 |
| 4,170,844 | 10/1979 | Steele | 47/62 |

FOREIGN PATENT DOCUMENTS 914004  3/1982  U.S.S.R. .................................. 47/60

Primary Examiner—Robert A. Hafer
Assistant Examiner—Bradley M. Lewis
Attorney, Agent, or Firm—Robert R. Finch

[57] ABSTRACT

A growing chamber defined by sidewalls and a top spanning the chamber inside the walls. The top is mounted to be vertically moveable to change the chamber height. The walls and top are coated to be ninety percent reflective. A horticultural lamp is mounted on the top and a timer turns it on and off. Carbon dioxide gas is supplied to the chamber the gas being controlled to be supplied intermittently, but only while the lamp is on.

2 Claims, 7 Drawing Figures

PLANT GROWING CHAMBER

FIELD AND BACKGROUND OF THE INVENTION

This invention relates to growing chambers in which a particular environment is automatically maintained to enhance growth therein.

Small greenhouses or hot beds are well known and have been in use for many decades. The typical greenhouse is made almost entirely from glass or other transparent material and relies on natural sunlight to promote growth. Horticultural lamps can be and are often used to supplement the sunlight. Nutrients and water are added as the grower deems necessary.

Growing chambers of the type described are useful and do fill a need. However, they suffer from the disadvantage that growing conditions, and thus the rate of plant growth therein, are subject to variation in weather and, even under the best of conditions, plants are limited to a few hours growth per day.

In contrast to above described greenhouses, the present invention presents ways and means by which plants grow at the optimum conditions for the particular plant. For instance, if the variety being grown flourishes best with sixteen daylight hours then, the growing chamber of this invention will provide that light period along with other special conditions. The net result is that plants grow from start to maturity in less time than under natural conditions. Moreover, due to other conditions provided by the invention the plant grows larger and has a greatly increased yield. For instance, tomatoes starting from dseed have reached fruit bearing maturity in 40-70 days as compared to the usual 60-80 days. Moreover, even in the shorter growing period, plants grown in this invention are bigger and yield increased several fold. Also, the fruit bearing life of the plant may be increased indefinitely by prudent pruning.

It is the primary object of this invention to provide a completely self contained growing chamber in which plants are grown at an enhanced rate without regard to natural weather conditions.

Another object is the provision, in a growing chamber of the type described, of means for completely immersing the plants in a controlled atmosphere adapted to the needs of the plants being grown.

Still another object is the provision of means insuring that the growing plant is enveloped in essentially shadowless artificial growing light.

A related important object is the provision of a growing chamber of the type described in which the chamber volume is adjustable to accommodate changing needs of the plants.

A still further object is the provision in a growing chamber of the type described of means whereby the plants may be grown hydroponically or, alternatively, in soil.

The foregoing and probably other objects of the invention are achieved by provision of an upright rectangular box that is open at the top and is also provided with a side door for access to the interior. A vertically moveable top is fitted inside the box and means are provided to position the top at various elevations therein. The entire interior surface of the chamber and top are painted with available high reflective paint as needed to give a high percentage of reflection—say at least 90%.

The top is shaped to act as a reflector and is connected to a support rope for raising and lowering it. A special horticultural bulb is mounted on the underside of the top. A typical bulb is a 400 watt bulb known as Super Metal Arc bulb made by Sylvania Corporation. The bulb may be larger or smaller depending on the chamber size. If desired, other and additional or supplemental bulbs such as special fluorescent horticultural lights may be used. A horticultural or growth light as referred to herein is one that provides essentially the same color spectrum as the sun. Desirably, the lamp will provide the same intensity as the summer sun in the southern United States.

Pans are provided in the chamber bottom. They may be filled with soil or equipped for use as hydroponic ponds. An air supply pump is used to keep the air fresh around the root system. Finally, and this is important, means are provided for introducing carbon dioxide into the chamber to maintain therein during growth periods at a relatively high level of carbon dioxide, on the order of five to ten times the carbon dioxide concentration found outdoors around plants during the growing season.

In order that the invention may be better understood and carried into effect reference is made to the accompanying drawings and the description thereof which are offered by way of example only and not in limitation of the invention the scope of which is defined by the appended claims and equivalents thereof rather than by any description.

DETAILED DESCRIPTION OF THE DRAWINGS

Figure 1:
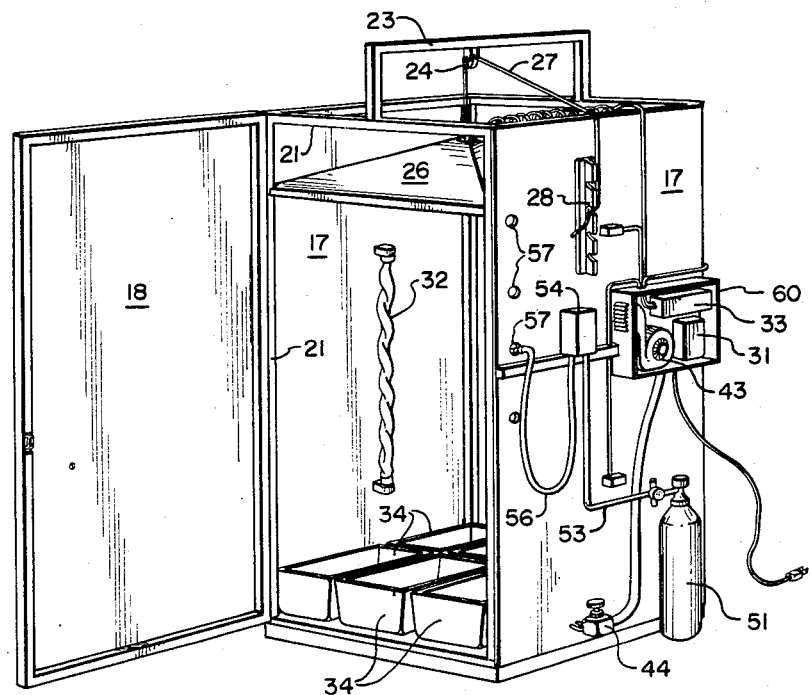
FIG. 1 is an outside perspective view from one side of the chamber with the door open.
Figure 2:
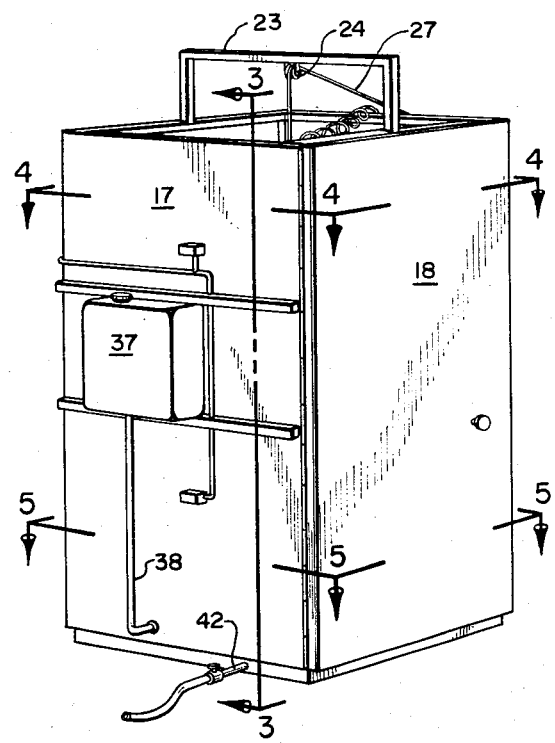
FIG. 2 is a perspective view of the other side of the chamber.
Figure 3:
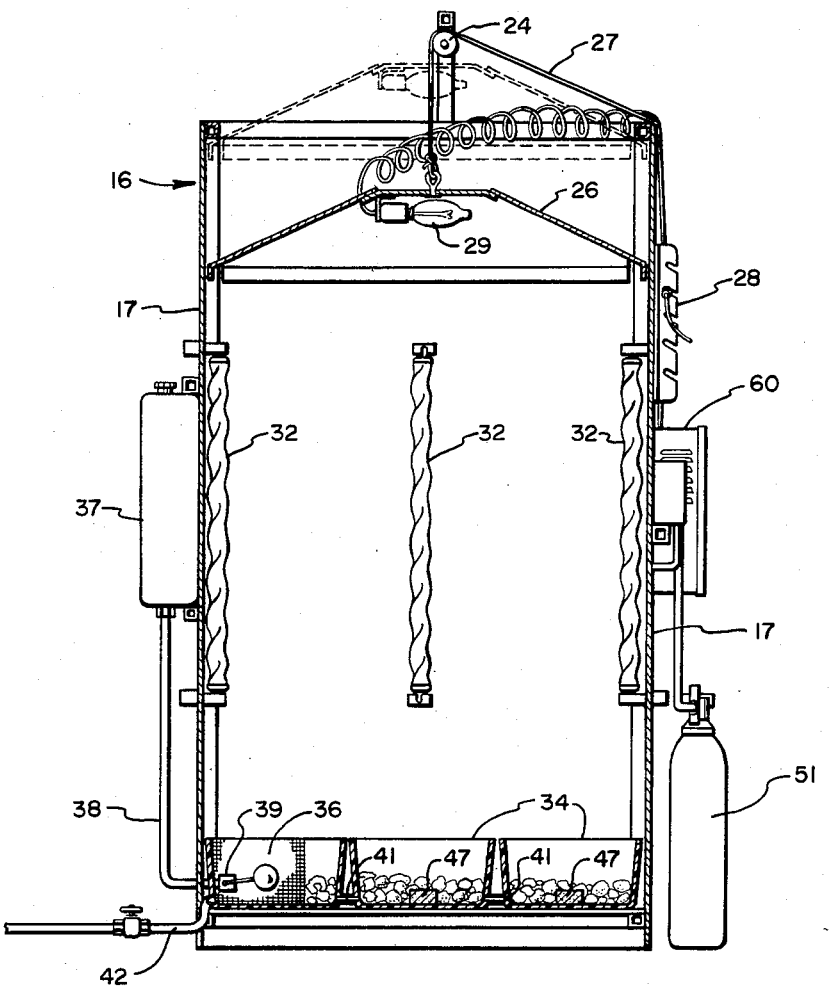
FIG. 3 is a sectional view taken in the plan of line 3—3 of FIG. 2.
Figure 6:
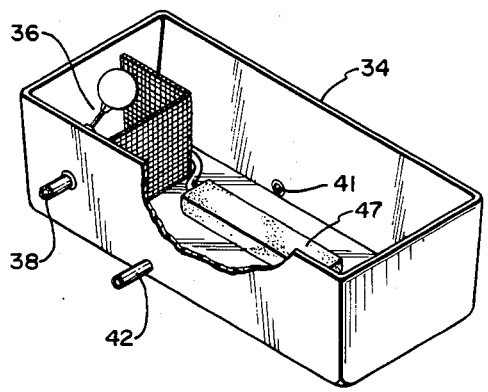
FIG. 6 is a partially cut away perspective view of the inlet pan for the liquid supply system.

The chamber 16 is formed as an open top box defined by three sidewalls 17 and a door 18. A bottom may be provided, but is not usually necessary. The walls and doors are formed from galvanized steel sheet secured to ¾" square tubes 21 used for framing and reinforcing as appropriate. A piece of square steel tube 23 is mounted on spaced apart uprights to form a gantry above and spanning the top of the chamber. A pulley 24 is secured to the mid point of the gantry above a movable top 26 that is fitted inside the chamber. A rope 27 is secured centrally to the top 26 thence passes through the pulley 24 and terminates outside the chamber where there is provided a slotted member 28 to which the rope can be tied to hold the top at a desired elevation in the chamber. It is important that the top fit relatively closely inside the chamber yet accommodate components therein. To this end the top will be notched as shown to permit vertical movement past obstructions in the chamber.

The inside walls and top are painted to be 90% reflective so there is essentially a shadowless illumination. This is superior to natural outdoor light.

A special bulb 29 of the type used to stimulate plant growth is mounted centrally on the underside of the top. The top is shaped as a pyramid to maximize light reflection. A suitable ballast 31 is provided on the outer wall of the chamber. Additional growing lights may be provided such as special fluorescent tubes 32 mounted vertically on the walls and connected to suitable ballast 33 on the outer chamber wall.

As illustrated, the chamber is suited for hydroponic plant growth. Six pans 34 are located on the floor. One pan has a separate float chamber 36 to receive water from a tank 37 of nutrient-laden water. Water flows from the tank through a tube 38 into a float controlled valve 39 in the chamber 36. Liquid from float chamber 36 flows serially into the other pans via connecting tubes 41. With this arrangement, the single float valve maintains the desired liquid level in all pans. For draining all pans, a single valved outlet pipe 42 is provided.

A continuous flow of air originating from a pump 43 flows through a tube into a distributing valve 44 thence, in parallel lines, into elongated porous air stones 47 located on the bottoms of the pans 34 beneath the liquid level therein. The air is thus introduced to the root system as fine bubbles.

For root support, a layer of porous stones covers the tank bottoms. Lava stone is excellent for this purpose.

Of prime importance is the concentration of carbon dioxide inside the chamber during the growing cycle. I have found that the carbon dioxide should be maintained at a concentration five to ten times the concentration found in nature for the same plant. In this invention, the necessary carbon dioxide concentration is maintained automatically. To this end, a tank 51 of carbon dioxide and associated equipment are provided. The tank has a usual regulator 52 which discharges gas through a tube 53 to a solenoid valve 54 through which it is discharged at selected intervals through a hose 56 inserted in a selected one of several ports 57 in the wall. The ports are at different elevations so that carbon dioxide may be introduced into the chamber just above the top of plants growing therein. The hose may be manually inserted in the proper port as shown or hoses can be permanently connected to the ports 57 and a valve used to distribute carbon dioxide to a selected port.

Figure 7:
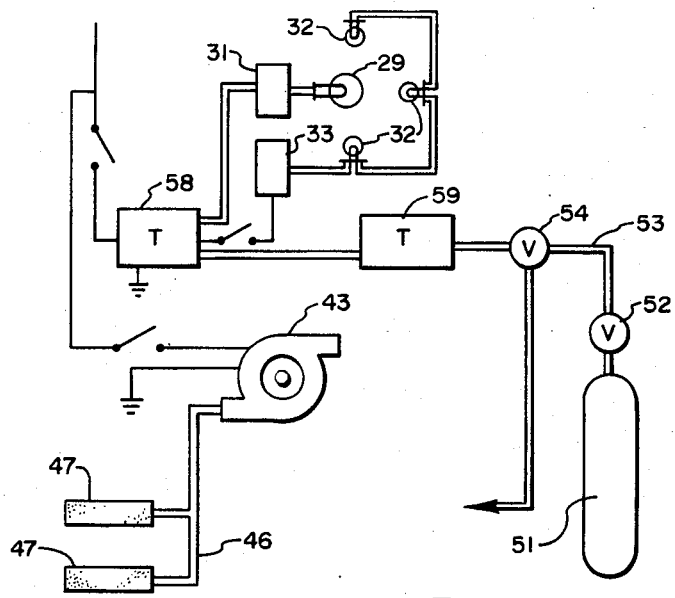
FIG. 7 is a sketch of the light, air and carbon dioxide supply system.
Figure 4:
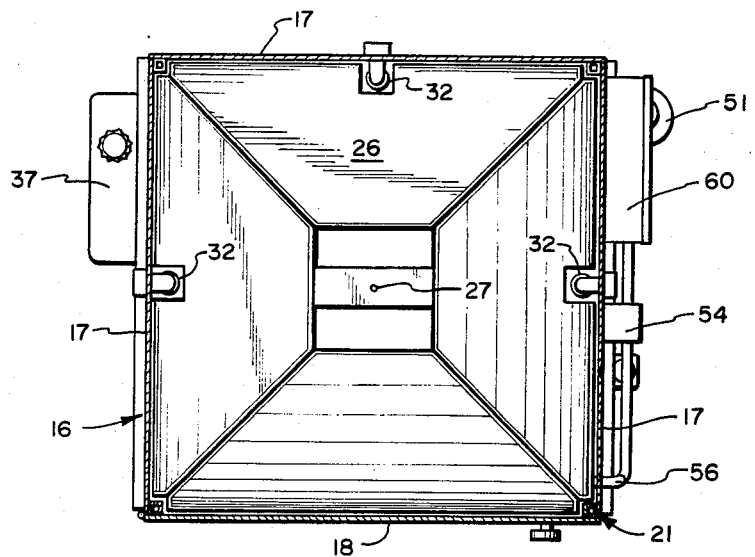
FIG. 4 is a sectional view taken in the plane of line 4—4 of FIG. 2.
Figure 5:
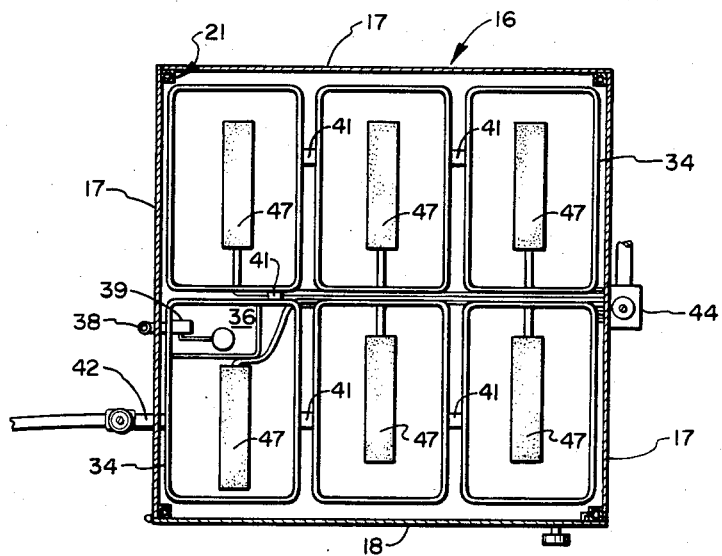
FIG. 5 is a sectional view taken in the plane of line 5—5 of FIG. 2.

It is important that growing conditions be continuously maintained. Thus, the air pump runs continuously and whenever the light is on the carbon dioxide supply system is activated. To accomplish this the system diagrammed in FIG. 7 is employed. A first timer 58 accepts the input power and turns on the lights as desired and at the same time powers a second timer 59 to run its program which typically is set to open the solenoid valve 54 at selected intervals for a selected on-time. The interval and on-time will be chosen to accommodate the type and number of plants in the chamber. According to the invention, whenever the primary growth light is on, sufficient carbon dioxide will be injected so that carbon dioxide concentration is at least five times that existing in nature. Usually, supplying carbon dioxide for thirty seconds every thirty minutes maintains a proper concentration. If the carbon dioxide concentration gets too low, the plants literally stop growing. On the other hand, with lights on and carbon dioxide present the plants grow at an amazing rate that is several times the best growth rate under optimum natural conditions.

The incoming air bubbles in the water provide readily available oxygen to the plant roots and excess air warms and rises through the chamber to exit between the wall and edges of the top. The carbon dioxide, being heavier than air, will usually stay in the chamber.

To maximize benefit of the growing chamber, characteristics of the plant to be grown must be considered. If the plant is known to thrive on warm humid days with sixteen hours of sunshine then the chamber should be programmed to provide sixteen hours of light coupled with carbon dioxide gas insertions to maintain a high carbon dioxide level. The air and nutrient supply will be continual. Some temperature control can be provided if desired by choice of location of the chamber and, if necessary, modifying the space around the top to allow more or less escape of hot air.

During plant growth, the reflective top should be lowered to be close to the plant top. The carbon dioxide inlet will be selected to be abreast of the plant top. As the plant grows, the top will be raised as will be the carbon dioxide inlet point.

For appearance and protection many of the system components may be housed in an enclosure 60 on the outside chamber wall.

In an actual embodiment of the invention a growing chamber four feet square by seven feet high was provided. One entire side panel was hinged as the door. A six gallon liquid nutrient supply tank was located on the outside surface of one side wall. Nutrient supply into the pans was controlled by a float valve as described. Air stones were located in the pans and covered with nutrient and crushed lava. Air was continuously supplied to the stones.

In the prototype, the sole source of light was a 400 watt horticultural light sold by Sylvania as its Super Metal Arc bulb. Carbon dioxide was provided by a conventional tank equipped with a Victor carbon dioxide regulator which directed carbon dioxide to a Century Electric solenoid LPG valve. Two timers were used. The primary timer was programmed to keep the horticultural light on for the desired daily time period, say sixteen hours, and for the same time period to provide power to a second timer that was programmed to open the solenoid valve for thirty seconds at thirty minute intervals. Thus, the carbon-dioxide enriched atmosphere was maintained only during the entire period the horticultural light was on. The carbon dioxide concentration was allowed to seek its own level when the light was off.

Using the above system, tomatoes were grown from seeds to harvest. For comparison, control plants were planted in good soil outdoors.

The seeds in the chamber sprouted two-three days faster than those outdoors. There was no seedling mortality in the chamber, but, outside, about 25% of seedlings were lost to natural causes. Thereafter, the seedlings inside grew at a rate at least five times that of the outdoor plants. The chamber plants were bushier, sturdier plants with a much greater number of blossoms. The blossoms appeared 10-14 days sooner indoors than outdoors and almost 100% bore fruit as compared to only about 80% of the surviving outdoor plants. The indoor plants were hand pollenized.

Each indoor plant bore about 5-6 times the amount of fruit produced by a single control plant. The indoor fruit was perfect in color, taste and all other factors while the outdoor fruit was insect damaged and less attractive. Since the indoor plants are protected from the elements, the plant may be greatly extended by prudent pruning.

Similar results were obtained with corn, honeydew melons, cantalopes, string beans and other vegetables.

Although the invention has been described in connection with hydroponic growth, the chamber will work well if dirt is provided in place of the ponds. In such a case, provision must be made to water the soil. Plants, such as corn, that leave their seed underground after sprouting may do better in soil.

The growing chamber need not be rectangular. Instead, the box can take any shape so long as the top spans the interior, is reflective and can be moved vertically therein.

I claim:

1. An artificial environment growing chamber comprising an upright box defined by four sides and a top within said box, means mounting said top for vertical movement in said box, a door providing access to the inside of said box through one of said sides, the inner surfaces of said walls and said top being coated with reflective material to be at least ninety percent reflective, a horticultural lamp mounted on the inner surface of said top, pan means in the bottom of said box for containing moisture and nutrient, means for supplying moisture and nutrient to said pan means from a source outside said box, root support material in said pan means, air supply means for introducing diffused air to said box at about the level of said root support means, means including a control valve for supplying carbon dioxide gas to said box at elevations therein above said root support means, and timer means operable simultaneously on said horticultural lamp and said control valve to light said lamp for selected extended timer periods and only during said time period said lamp is on to intermittently open said control valve to introduce carbon dioxide gas to said box in amounts sufficient to maintain in said box a carbon dioxide concentration that for any given plant in said chamber is at least five times the concentration of carbon dioxide existing in nature during optimum growing conditions for said given plant.

2. A growing chamber according to claim 1 in which said movable top is shaped as a pyramid, said horticultural lamp is a metal halide lamp and additional horticultural lamps are mounted on the inner sidewalls of said chamber.

* * * * *